United States Patent
Reid et al.

(10) Patent No.: US 10,898,830 B2
(45) Date of Patent: Jan. 26, 2021

(54) SETTLER FOR DECANTING MINERAL SLURRIES AND METHOD FOR SEPARATING CLARIFIED LIQUID FROM THICKENED SLURRY OF SAID MINERAL SLURRIES

(71) Applicant: Rio Tinto Alcan International Limited, Montreal (CA)

(72) Inventors: Michael Reid, Jonquière (CA); Guy Peloquin, Jonquière (CA); Matthieu St-Laurent, Jonquière (CA); Philippe Racine, Chicoutimi (CA)

(73) Assignee: Rio Tinto Alcan International Limited, Montreal (CA)

( * ) Notice: Subject to any disclaimer, the term of this patent is extended or adjusted under 35 U.S.C. 154(b) by 83 days.

(21) Appl. No.: 15/106,694

(22) PCT Filed: Nov. 28, 2014

(86) PCT No.: PCT/IB2014/002618
§ 371 (c)(1),
(2) Date: Jun. 20, 2016

(87) PCT Pub. No.: WO2015/092504
PCT Pub. Date: Jun. 25, 2015

(65) Prior Publication Data
US 2017/0001129 A1  Jan. 5, 2017

(30) Foreign Application Priority Data
Dec. 20, 2013 (EP) ..................... 13006034

(51) Int. Cl.
*B01D 21/08* (2006.01)
*B01D 21/24* (2006.01)
(Continued)

(52) U.S. Cl.
CPC ............. *B01D 21/08* (2013.01); *B01D 21/01* (2013.01); *B01D 21/06* (2013.01);
(Continued)

(58) Field of Classification Search
CPC ...................................................... B01D 21/08
See application file for complete search history.

(56) References Cited

U.S. PATENT DOCUMENTS

| 2,528,094 A | 10/1950 | Walker |
| 4,040,954 A | 8/1977 | Chandler |

(Continued)

FOREIGN PATENT DOCUMENTS

| WO | WO9633000 A1 | 10/1996 |
| WO | WO2012003578 A1 | 1/2012 |
| WO | WO2015092503 A1 | 6/2015 |

OTHER PUBLICATIONS

Mar. 13, 2015—International Search Report—PCT/IB2014002618.
(Continued)

*Primary Examiner* — Peter Keyworth
(74) *Attorney, Agent, or Firm* — Banner & Witcoff, Ltd.

(57) ABSTRACT

A settler for decanting mineral slurries includes a tank having a side wall, a bottom and a top, an outlet for a thickened slurry at the bottom of the tank, a first overflow outlet for withdrawing an overflow stream of a clarified liquid, a slurry inlet means for introducing fresh slurry into (Continued)

the tank, the slurry inlet means having a slurry opening through which fresh slurry joins a body of slurry in the tank, and a stirrer having a vertical axis around which the stirrer rotates or reciprocates, in said settler the slurry opening is displaced laterally relative to said vertical axis of the stirrer and said slurry inlet means comprises mixing means. A separation installation includes the above settler and a method for separating a clarified liquid from a thickened slurry of a mineral slurry.

19 Claims, 5 Drawing Sheets

(51) Int. Cl.
    *C01F 7/06*     (2006.01)
    *B01D 21/06*     (2006.01)
    *B01D 21/32*     (2006.01)
    *B01D 21/01*     (2006.01)

(52) U.S. Cl.
    CPC ...... *B01D 21/2405* (2013.01); *B01D 21/2411* (2013.01); *B01D 21/2427* (2013.01); *B01D 21/2444* (2013.01); *B01D 21/32* (2013.01); *C01F 7/0646* (2013.01); *C01P 2006/80* (2013.01)

(56) References Cited

U.S. PATENT DOCUMENTS

| | | | |
|---|---|---|---|
| 4,054,514 A | 10/1977 | Oltmann | |
| 4,089,782 A * | 5/1978 | Huebner | B01D 21/10 210/206 |
| 4,830,507 A | 5/1989 | Bagatto et al. | |
| 5,770,091 A * | 6/1998 | Binot | B01D 21/01 210/711 |
| 6,936,178 B2 * | 8/2005 | Peloquin | B01D 21/0018 210/519 |
| 2004/0011737 A1 * | 1/2004 | McDowell | C02F 3/006 210/620 |
| 2006/0006114 A1 * | 1/2006 | Deskins | B01D 21/0012 210/724 |

OTHER PUBLICATIONS

Ter Weer, Peter-Hans. "Redundancy of Security Filtration." Light Metals 2010, TMS/AIME, Warrendale PA, USA, Feb. 14-18, 2010, pp. 113-118.

Mar. 16, 2015—International Search Report—PCT/IB2014/002606.

\* cited by examiner

SETTLER FOR DECANTING MINERAL SLURRIES AND METHOD FOR SEPARATING CLARIFIED LIQUID FROM THICKENED SLURRY OF SAID MINERAL SLURRIES

CROSS-REFERENCE TO RELATED APPLICATIONS

This application is a U.S. National Stage application under 35 U.S.C. § 371 of International Application PCT/IB2014/002618 (published as WO/2015/092504 A1), filed Nov. 28, 2014, which claims priority to European Patent Application No. EP 13006034.6, filed Dec. 20, 2013, and the present application claims priority to and the benefit of the filing date of each of these prior applications, each of which is incorporated by reference in its entirety.

DOMAIN OF THE INVENTION

The present invention relates to settlers for mineral slurries used in industrial processes. More particularly, the invention relates to settlers used for decanting or thickening slurries of minerals or mineral tailings, for example red mud, produced during the extraction of alumina from bauxite by the Bayer alkaline digestion or attack process. Sometimes such settlers are referred to as gravity settlers, pressure settlers, clarifiers, separators, thickeners, deep thickeners, and the like. In the following, the settler can also be referred as gravity settler vessel.

The present invention also relates to a separation installation comprising such a settler and to a method for separating a clarified liquid from a thickened slurry of a mineral slurry.

The following description of the invention focuses on the settling of Bayer process slurries. However, it is emphasized that the present invention has broader application than this and relates generally to the settling of any type of process slurries.

BACKGROUND OF THE INVENTION

Many industrial processes make use of tanks or reservoirs in which slurries of mineral materials or tailings are allowed to settle and densify, often with the assistance of flocculants or other chemical aids, to produce a thickened lower slurry layer and a clarified or liquid upper layer. The thickening process may be required for various reasons, but is often used to produce a thick mud or plastic solid that may be disposed of or transported more easily and economically than a thin slurry. The clarified liquid may then be recirculated to the same industrial process or disposed of directly.

For example, processes for producing alumina trihydrate by alkaline digestion of bauxite ore, known as Bayer processes, have separation means for treating a slurry obtained from the digestion of bauxite ore, in order to separate an enriched sodium aluminate liquor from insoluble residues known as red mud. The separation means are usually connected to precipitation means for treating the enriched sodium aluminate liquor in order to precipitate alumina trihydrate. The separation means often comprises pre-treatment means for adding flocculants to the slurry and a settler, connected to said pretreatment means, for producing a clarified liquor. The pre-treatment means usually improve the performance of the settler by producing an overflow stream of clarified liquor out of the settler that has a low concentration of solid particles.

In the known Bayer processes, the separation means usually include filtration means for removing at least part of the remaining particles of insoluble residues from the clarified liquor. The use of filtration after the settler makes sure that the supersaturated liquor to be sent to the precipitation means is of high purity. The industries have always looked at, and are still looking at, improving the performance of the Bayer process separation means, and more particularly of the settler, with the aim to simplify the implementation and the operation of the filtration step and to reduce associated cost.

Known settlers for treating mineral slurries, such as red mud, usually comprise a tank for holding and decanting a body of slurry to form a thickened slurry as a lower layer and a clarified liquid as an upper layer, the tank having a side wall, a bottom and a top, an outlet for the thickened slurry at the bottom of the tank, and an overflow outlet for withdrawing an overflow stream of the clarified liquid. The slurry to be decanted is introduced into the tank via a feed well that is usually an upright cylinder consisting of a cylindrical side wall having an open upper end and is partially submerged beneath the upper surface of the slurry in the tank. The settling process is usually assisted by an upright rotating stirrer in the form of a rake or the like arranged centrally in the tank.

U.S. Pat. No. 6,936,178 describes a settler for mineral slurries, such as red mud from the Bayer process, which minimizes problems that can be caused by unwanted solid deposit due to the large proportion of coarse particles contained in said slurries. The settler described in the above patent have a slurry inlet means having a slurry opening through which fresh slurry joins the body of slurry in the tank and is configured to avoid accumulation of solids from said fresh slurry immediately upstream of the slurry opening. In addition, the slurry opening is displaced laterally relative to the generally vertical axis of the stirrer around which the stirrer rotates or reciprocates.

There is a need to provide a settler for decanting mineral slurries, such as red mud, that can produce reliably an overflow stream of clarified liquid that has a low concentration of solid particles, while maintain the density of the thickened slurry at an acceptable level.

DESCRIPTION OF THE INVENTION

An object of the present invention is to improve settler design in order to accommodate slurries containing coarse particles, such as red mud, and to produce reliably an overflow stream of clarified liquid that has a low concentration of solid particles, while maintaining the density of the thickened slurry at an acceptable level.

Another object of the present invention is to optimize the performance of the flocculant, and thereby limit the quantity of flocculant to be added.

According to the present invention there is provided a settler for decanting mineral slurries, comprising
- a tank for holding and decanting a body of slurry to form a thickened slurry as a lower layer and a clarified liquid as an upper layer, the tank having a side wall, a bottom and a top,
- an outlet for the thickened slurry at the bottom of the tank,
- a first overflow outlet for withdrawing an overflow stream of the clarified liquid,
- a slurry inlet means near the top of the tank for introducing fresh slurry into the tank, the slurry inlet means having a slurry opening through which fresh slurry joins the body of slurry in the tank, and a stirrer having a generally vertical axis around which the stirrer rotates or reciprocates, said settler being characterized in that said slurry opening is displaced laterally relative to said generally vertical axis of the stirrer and said slurry inlet means comprises mixing means.

Preferably, the slurry inlet means defines a through flow area comprising the mixing means. More preferably, the slurry inlet means defines a through flow area comprising the mixing means for mixing flocculant with fresh slurry at the same time as diluting said flocculant in the body of slurry hold by the tank. Preferably, the mixing means are bottomless, that is to say it does not contain any mechanical part on which solids could accumulate. This configuration prevents solids accumulation immediately above the slurry opening of the slurry inlet means. This configuration also promotes the dilution, within the slurry inlet means, of flocculant with the slurry from the body of slurry at the same time as the mixing of said flocculant with fresh slurry.

The stirrer can be referred to as a rake, since it can be in the form of a rake having a rotatable or reciprocal central vertical rod aligned with the vertical axis.

By the term "displaced laterally" it is meant that the vertical axis of the stirrer (or an upward extension thereof) does not pass through the slurry opening as the opening is displaced horizontally sideways relative to the axis. The slurry opening normally opens substantially downwardly, thus facing the bottom of the tank.

The slurry inlet means can be referred to as feed well. More precisely, it is a vertically oriented feed well provided with a slurry opening at the bottom of the feed well creating a slurry flow into the body of slurry in the tank. The position of the insert means in relation to the generally vertical axis of the stirrer implies that it could be referred to as an off-center feed well.

The position of the feed well in relation to the settler prevents the accumulation of solid particles and the blocking of the underflow of thickened material. In addition, such an off-center feed well combined with the use of mixing means in said off-center feed well allows operation of distinctive mixing conditions respectively in the feed well and in the settler.

The vertical axis of the stirrer is preferably aligned concentrically with the outlet for the thickened slurry, with both the axis and the outlet being in the center of the tank. The slurry opening then preferably has a center positioned at a distance from the center of the tank by at least 5%, and more preferably at least 10%, of the distance between the center and the side wall of the tank. In fact, the slurry opening may be positioned 50% or more of the distance between the center of the tank and the side wall, and indeed may be positioned immediately adjacent to the side wall of the tank.

The settler of the invention may be provided with more than one slurry inlet means, all of which have slurry openings displaced laterally relative to the vertical axis of the stirrer.

Preferably, the mixing means operates independently from the stirrer.

When the mixing means of the feed well comprise one or more rotating stirrers mounted on the same rotating axis, the off-center configuration of the feed well allows setting the rotating speed of the stirrer(s) that is different to the speed of the stirrer in the settler. In general, the rotating speed of the feed well stirrer is greater than the one of the stirrer inside the settler.

Preferably, the slurry inlet means is configured to avoid accumulation of solids from the fresh slurry immediately upstream of the slurry opening.

The slurry inlet means have a cross sectional area transversely of the slurry flow immediately upstream of the slurry opening, and advantageously the slurry opening has a cross-sectional area that is at least 80% as large as the cross-sectional area of the feed well immediately upstream of the slurry opening. Ideally, the slurry opening is the same size (area) as the cross-section of the slurry inlet means immediately upstream of the slurry opening, or is not significantly smaller. This avoids or prevents substantial accumulation of solids from the fresh slurry in the feed well immediately upstream of the slurry opening as the fresh slurry does not become unduly quiescent within the feed well.

The accumulation of solids from the fresh slurry immediately upstream of the opening in the slurry inlet means may be avoided by maintaining a suitably high rate of flow of fresh slurry throughout the entire slurry inlet means and the slurry opening to prevent settling of solids.

Preferably, the mixing means of the slurry inlet means comprises at least one rotating stirrer. At least one, preferably all, rotating stirrer(s) can be a blade type stirrer.

Preferably, the slurry inlet means comprise an upright cylindrical wall, the mixing means of said slurry inlet means being operated in a circular area having a diameter that is from 0.4 to 0.8, for example 0.6, times the diameter of said upright cylindrical wall. This allows optimizing the contact between flocculants and solid materials within the slurry inlet means.

Preferably, the slurry inlet means comprise a slurry feeding pipe arranged in such a way that the slurry is fed tangentially into the slurry inlet means. This allows decelerating the speed of the flocculated slurry more gradually along the side wall of the slurry inlet means, thereby limiting the attrition of the aggregates of solid material.

Preferably, the mixing means of the slurry inlet means comprise two rotating stirrers, arranged lower and higher in relation to the slurry feeding pipe. The use of two rotating stirrers makes sure that most of the internal volume of the slurry inlet means is agitated. The arrangement of the two rotating stirrer respectively lower and higher in relation to the slurry feeding pipe makes sure that the flocculated slurry is fed in an agitated region of the slurry inlet means.

Preferably, the slurry opening is arranged in the bottom of the slurry inlet means. This is to make sure that the solid particles of the flocculated slurry fed to the slurry inlet means do not accumulate at the bottom of said slurry inlet means. This prevents any cleaning or descaling operation.

According to a preferred embodiment, the settler of the present invention comprises a second overflow outlet for withdrawing an off spec overflow stream of the clarified liquid when a measured value representative of the concentration of solid particles in the clarified liquid is more than a predetermined threshold, the overflow stream of the clarified liquid being withdrawn from the first overflow outlet while said measured value is less than the predetermined threshold.

In the context of a Bayer process, a settler having two separate overflow outlets implies that there are two separate lines, one connected to the precipitation step, and the other one connected to the pre-treatment step.

Preferably, the second overflow outlet is positioned at a higher level than the first overflow outlet. With such a configuration, there is a delay before an off spec overflow stream of the clarified liquid flows out of the second overflow outlet. This delay gives some time to react before acting on the operation of separation means. This delay is a function of a vertical distance between both overflow outlets. With such a configuration, there is no need to have a valve in the line connected to the second overflow outlet. So there is no prejudicial effect of the scale on valve operation, more particularly on valve opening, since there is no valve.

According to the present invention there is provided a separation installation for separating a clarified liquid from a thickened slurry of a mineral slurry comprising pre-treatment means for adding flocculants to a fresh slurry and for mixing said fresh slurry with said flocculants and obtain a flocculated slurry, characterized in that the separation installation further comprises the above described settler, said settler being connected to said pre-treatment means for decanting said flocculated slurry and for producing a clarified liquid.

The present invention is also related to a method for separating a clarified liquid from a thickened slurry of a mineral slurry, that includes settling a fresh slurry in a settler which comprises
introducing said fresh slurry into a body of slurry in a tank provided with a stirrer rotating or reciprocating about a generally vertical axis to form the thickened slurry as a lower layer and the clarified liquid as an upper layer, said fresh slurry being introduced at a slurry inlet means through an opening,
removing thickened slurry from an outlet at a bottom of the tank, and
removing clarified liquid adjacent to a top of the tank from a first overflow outlet,
the method being characterized in that said fresh slurry is mixed using mixing means in said slurry inlet means, and is introduced into the tank through said opening at a position spaced laterally from said generally vertical axis of the stirrer.

Preferably, the slurry inlet means defines a through flow area comprising the mixing means.

Preferably, the method comprises pretreating the fresh slurry in a pre-treatment step by adding a flocculant to said fresh slurry and mixing the flocculant and the slurry to obtain a flocculated slurry.

The overall objective of pre-treatment step is to promote the formation of aggregates of solid material in the slurry that in turn facilitates the settling of the solid material in the resulting flocculated slurry. One purpose of mixing the flocculants and the slurry in the pretreatment step is to increase the probability of contact between the flocculants and solid materials in the slurry. Another purpose of mixing the flocculants and the slurry is to maintain dispersion, preferably a homogeneous dispersion, of solid material, including any aggregates of solid material that form, in the slurry and to minimize settling of solid material in the apparatus used in the pre-treatment step. Another purpose of mixing the flocculants and the slurry is to allow the aggregates to grow to a size suitable to facilitate separation of solid material, including aggregates of solid material, and the liquor in the settling tank.

Preferably, the pre-treatment step comprises an initial mixing step of the slurry with at least part of the flocculants, a final mixing step of the slurry with the flocculants in the slurry inlet means, and selecting a rate of mixing in the initial mixing step that is higher than the rate of mixing in the final mixing step.

The rate of mixing is meant to represent the shear strength applied to the flocculated slurry that is to say to the flocculants, to the solid particles of the slurry and to the solid materials that have been already formed aggregates of solid particles with the help of said flocculants. The aggregates of solid material are also referred to as flocs. The rate of mixing can be determined by measuring the speed of the agitation, for example by measuring the speed of the end of the rotating stirrer.

It was found that the rate of mixing applied in the different mixing steps has an impact, not only on the contact between the solid particles and the flocculants, but also on the breaking up of the aggregates of solid material. In other word, there is an optimum rate of mixing to be found. More precisely, there is a sequence of different rates of mixing to be applied to the slurry, in order to either optimize contact between the solid particles and the flocculants or/and to prevent breaking up of the aggregates of solid material. If the rate of mixing is two low, there is not enough contact between the solid particles and the flocculants. If the rate of mixing is too high the solid particles that have already agglomerated tend to break up. By selecting a rate of mixing in the initial mixing step that is higher than the rate of mixing in the final mixing step, it was surprisingly found that the performance of the following settling step in the settler was significantly improved.

The pre-treatment step may also comprise varying the flocculants dosage rate during the course of the step. The pre-treatment step may comprise selecting a higher dosage rate in an early stage of the step than in a later stage of the step.

Without being bound by any theory, it appears that the above described selection of the rate of mixing and the variation of dosage rates have further enhance the probability of contact of the solid material and the flocculants at the early stage of the pre-treatment step and further promote aggregate formation while maintaining a dispersion of the solid material, including any aggregates that may form, in the flocculated slurry.

It has been found that a pre-treatment step that comprises adding flocculent to at least one upstream tank with a high rate of mixing and to a downstream tank or a slurry inlet means of the gravity settler with a slow rate of mixing can significantly improve the performance of the separation step.

The impact of such flocculent addition scheme can be evaluated by taking into account, in the one hand, the clarity of the clarified liquor produced during the settling step of the flocculated slurry or its concentration of insoluble residues, and in the other hand, the settling velocity of the flocculated slurry during said separation step.

As far as the clarity of the clarified liquor is concerned, the clarified liquor that is obtained in the surface of the gravity settler vessel has a concentration of insoluble residues that is in the order of magnitude of 10 mg/L, which is much less than when using conventional flocculation pre-treatment step.

As far as the settling velocity of the flocculated slurry is concerned, it is indeed an important parameter to be taken into account, since said settling velocity is associated with the efficiency of the settler used in the separation step. The process of the invention being obviously intended to be used in industrial scale plants, the flocculation pre-treatment needs to be run in a way that maximizes the settling velocity. In particular, the method of the present invention needs to be compatible with the use of a high rate decanter in the solid/liquor separation step.

Consequently, the resulting clarified liquor had a significantly reduced amount of solid particles so that, in the context of the Bayer process, no filtration was anymore required and the clarified liquor could be directly fed to the precipitation step.

Preferably, the initial mixing step comprises passing the slurry through a first and a second mixing device. The mixing device forming the initial mixing means can be inline mixer or preferably a mixing tank.

Preferably, the mixing means of the slurry inlet means comprises at least one rotating stirrer. The speed at the tip of the stirrer can be adjusted to between 0.3 to 0.7 m/s.

Preferably, the slurry inlet means of the settler have a slurry opening through which the flocculated slurry is introduced into the settler, the speed of the flocculated slurry introduced into the settler being maintained from 100 to 150 m/h.

The speed of the flocculated slurry introduced into the settler can be determined by dividing the flow rate of said slurry by the cross section area of the slurry opening of the feed well. Maintaining the speed of the flocculated slurry introduced into the settler in the above range makes sure that such a speed is not too low to distribute the solid material of the flocculated slurry in most of the internal volume of the settler, and not too high to prevent attrition of the aggregates of solid material and entrainment with the clarified liquor.

According to one preferable aspect of the invention, the method comprises
  withdrawing an overflow stream of the clarified liquid from the first overflow outlet, while a measured value representative of the concentration of solid particles in the clarified liquid is less than the predetermined threshold,
  stopping withdrawing the overflow stream from the first overflow outlet, when the measured value is more than the predetermined threshold, and
  withdrawing an off spec overflow stream of the clarified liquid from a second overflow outlet, when the measured value is more than said predetermined threshold.

In the context of a Bayer process, the line between the first overflow outlet and the precipitation step has a valve. This valve will be maintained close only while the operation is upset, that is to say when the measured value is more than the predetermined threshold. Since the duration while the valve is closed should be limited, scale does not have time to build up and the opening of the valve will not be prevented by scale.

In the context of a Bayer process, when the method of the invention is used for treating a slurry obtained from the alkaline digestion of bauxite ore in order to separate an enriched sodium aluminate liquor from insoluble residues, it provides a significantly simplified separation step that is essentially carried out by gravity settling, and does not require the use of a filtration step. In this context, the method of the invention prevents the production of alumina with an unacceptable purity and/or the occurrence of incidents in the operation of the alumina recovery steps that follows the separation step.

BRIEF DESCRIPTION OF DRAWINGS

The invention is described in the following figures illustrating, without limitation, one embodiment of the settler, the separation installation and the method of the invention.

DESCRIPTION OF EMBODIMENTS

Figure 1:
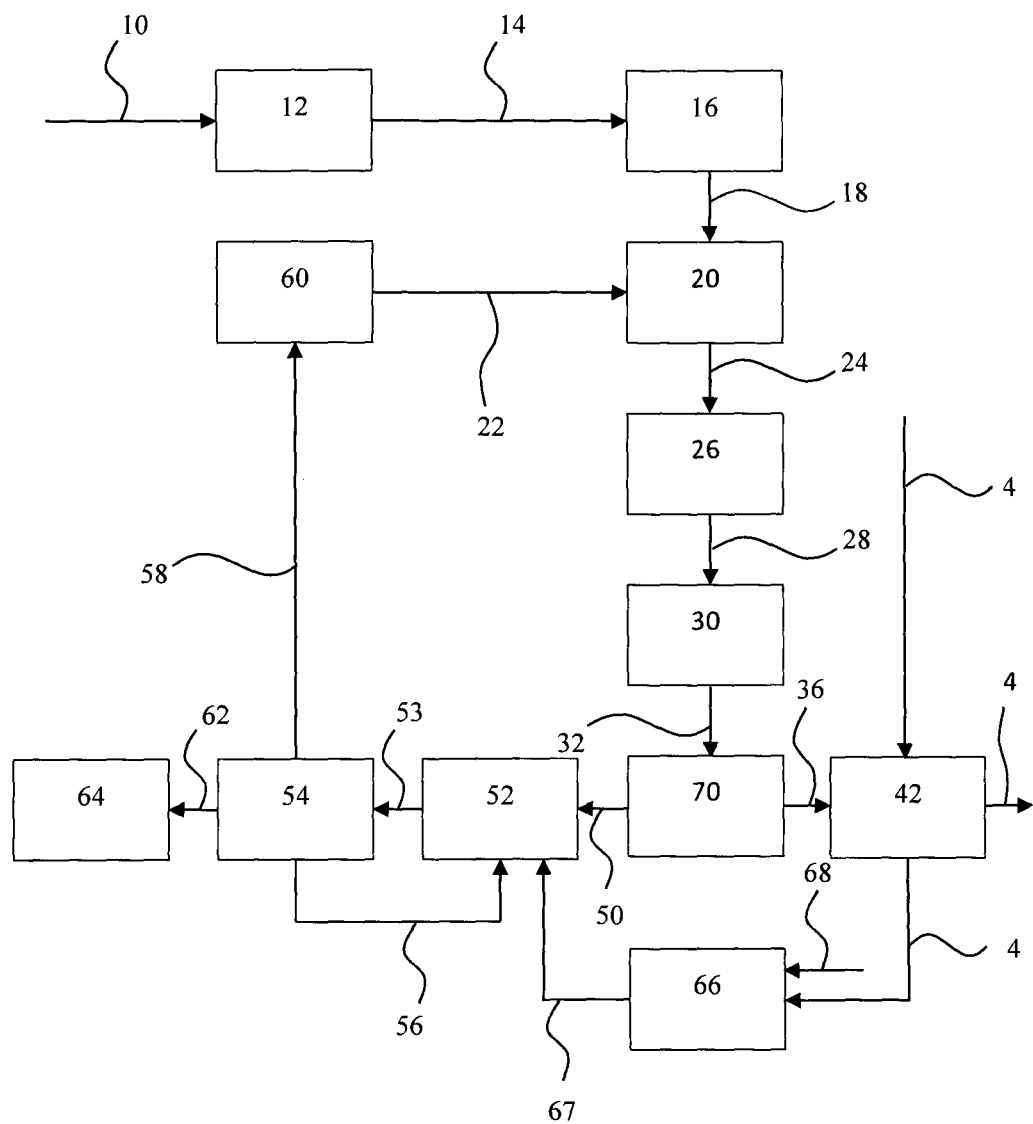
FIG. 1 is a diagram that illustrates an example of a Bayer process that uses a settler according to the present invention.

The process schematically illustrated in FIG. 1, represents the main process steps for producing alumina trihydrate from bauxite ore of a known Bayer process.

Referring to FIG. 1, the bauxite ore 10 is fed to a grinding step 12, in order to crush the ore usually in the presence sodium aluminate liquor. The resulting slurry 14 is fed to a desilication step 16. After desilication, a slurry of desilicated liquor 18 and bauxite ore is preheated in a pre-heating step 20 and brought into contact with a sodium aluminate liquor which is provided from a fresh sodium aluminate liquor stream not shown and from a sodium aluminate liquor recycled stream 22. The preheated slurry 24 of sodium aluminate liquor and bauxite ore is fed to an digestion step 26 in an digestion chain where the digestion is carried out under pressure and at high temperature. The digestion chain is usually comprised of by a series of autoclaves in which the slurry circulates. During the digestion process, a slurry comprising of enriched sodium aluminate liquor and insoluble residues is obtained. During the digestion, the slurry passes through heat exchangers not shown allowing the recovery of heat into the preheating step 20. The slurry 28 resulting from the digestion is then depressurized in a step 30. The depressurized slurry 32, which still includes enriched sodium aluminate liquor and insoluble residues, is then sent to a separation step in order to separate the enriched sodium aluminate liquor from the insoluble residues. The separation step typically includes a decanting or settling step 70 in a gravity settling vessel in which the insoluble residues are separated from the enriched sodium aluminate liquor by gravitation. The settling tank is generally under pressure. The insoluble residues are removed from the bottom of the settling tank in the form of red mud 36 while the enriched sodium aluminate liquor, usually referred to as clarified liquor, is separated from the red mud in an overflow stream 38 of said settling tank. The red mud 36 is then washed with water 40 in countercurrent washers 42, in order to recover sodium aluminate. The overflow 44 of a first washer, which has a very high content of sodium aluminate, passes through an auxiliary filtration step 66, and the filtrate stream 67 obtained during said filtration step is then sent to a precipitation step 52 described hereafter. The washed red mud 46 is sent to a disposal area. A stream 50 of the enriched sodium aluminate liquor separated from the insoluble residues is sent to further steps for recovering the alumina as smelter grade alumina. These steps include a precipitation step and a calcination step. Generally, before being precipitated, the supersaturated aluminate liquor stream 50 is further cooled to increase supersaturation of dissolved sodium aluminate. The precipitation is carried out in a decomposition chain that includes a series of precipitators 52, where the filtrate 50 is progressively cooled for precipitating the alumina trihydrate. The precipitation generally further includes a classification step carried out in classification circuit 54. The classification circuit is fed with a slurry of alumina trihydrate 53 which exits the precipitation circuit 52. A stream 56 of fine alumina trihydrate is separated in the classification circuit 54 and is recycled back to the precipitation circuit 52 as seed. On leaving the classification circuit 54, a depleted or spent liquor 58 is concentrated by evaporation 60 and the resulting concentrated liquor is sent back to the digestion step via the recycled stream 22, while the produced alumina trihydrate 62 is fed to a calcination step 64.

In the known Bayer processes, the separation step generally requires, after the settling step, a further filtration step for removing at least part of the remaining particles of insoluble residues from the clarified liquor. The remaining particles being often very fine, a filtration additive, such as lime or tricalcium aluminate, needs to be applied to the filtration cloth to prevent blockages and improve the filtration rate. The same apply to the auxiliary filtration step 66 that requires tricalcium aluminate 68. The tricalcium aluminate is usually obtained from lime as raw material, but also consumes sodium aluminate and therefore reduces the conversion efficiency of the Bayer process. The equipment and the operation of the filtration step are therefore quite complex and result in high capital and operating costs.

The separation step 70 of the process illustrated in FIG. 1 is essentially carried out by settling the slurry in a gravity settler vessel according to the present invention, and does not require the use of a filtration step before the precipitation step 52, 54. Thanks to a specific design of the gravity settler vessel and its feed well, that will be described in detail hereafter, the clarified liquor that was obtained in the surface of the gravity settler vessel has a concentration of insoluble residues that is in the order of magnitude of 10 mg/L. The specific design of the gravity settler vessel combined with a specific control scheme based on continuous measurement of turbidity of the clarified liquor, makes it possible to feed a stream 50 of said clarified liquor directly to the precipitation step, while maintaining the purity of the alumina produced and the reliability of later steps of alumina recovery process.

Figure 2:
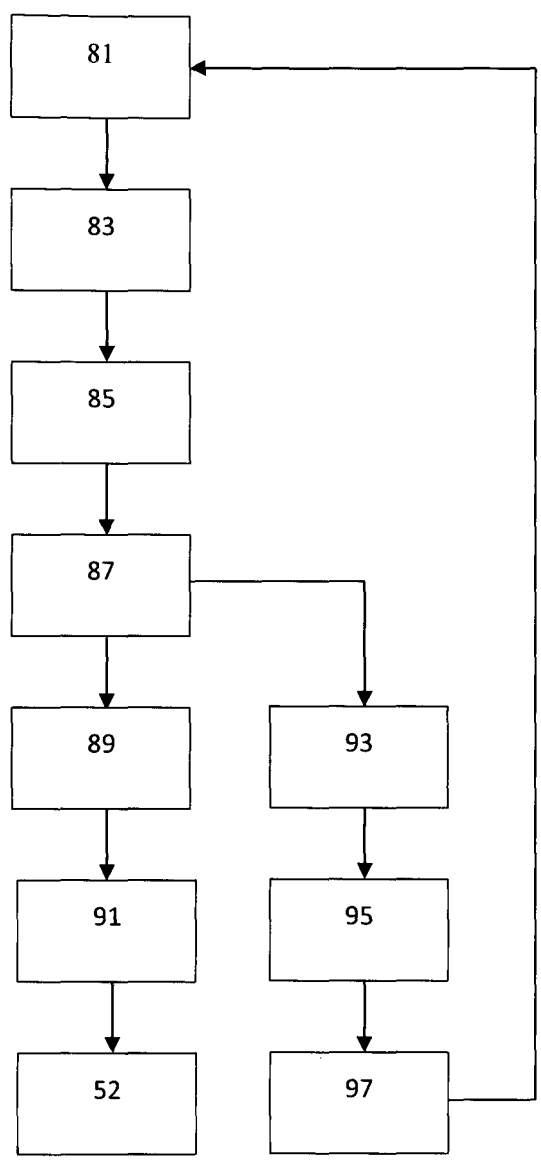
FIG. 2 represents an example of the separation method according to the present invention in the context of a Bayer process.

Referring now to FIG. 2, the separation step 70 includes:
pretreating the slurry, in a pre-treatment step 81, by adding a flocculant to said slurry and mixing the flocculant and the slurry to obtain a flocculated slurry,
settling 83 said flocculated slurry in a gravity settler vessel to produce a clarified liquor and a thickened slurry of insoluble residues,
determining a measured value representative of the concentration of solid particles in the clarified liquor, in a measurement step 85, and
comparing 87 the measured value with a predetermined threshold.

While the measured value is less than said predetermined threshold, the separation step 70 includes:
withdrawing 89 an overflow stream of the clarified liquor from a first overflow outlet of the gravity settler vessel, and
feeding 91 said clarified liquor directly to the precipitation step 52.

When the measured value is more than said predetermined threshold, the separation step 70 includes:
stopping 93 withdrawing the overflow stream from the first overflow outlet,
withdrawing 95 an off spec overflow stream of the clarified liquor from a second overflow outlet of said gravity settler vessel, and
redirecting 97 said clarified liquor to the pre-treatment step 81.

Figure 3:
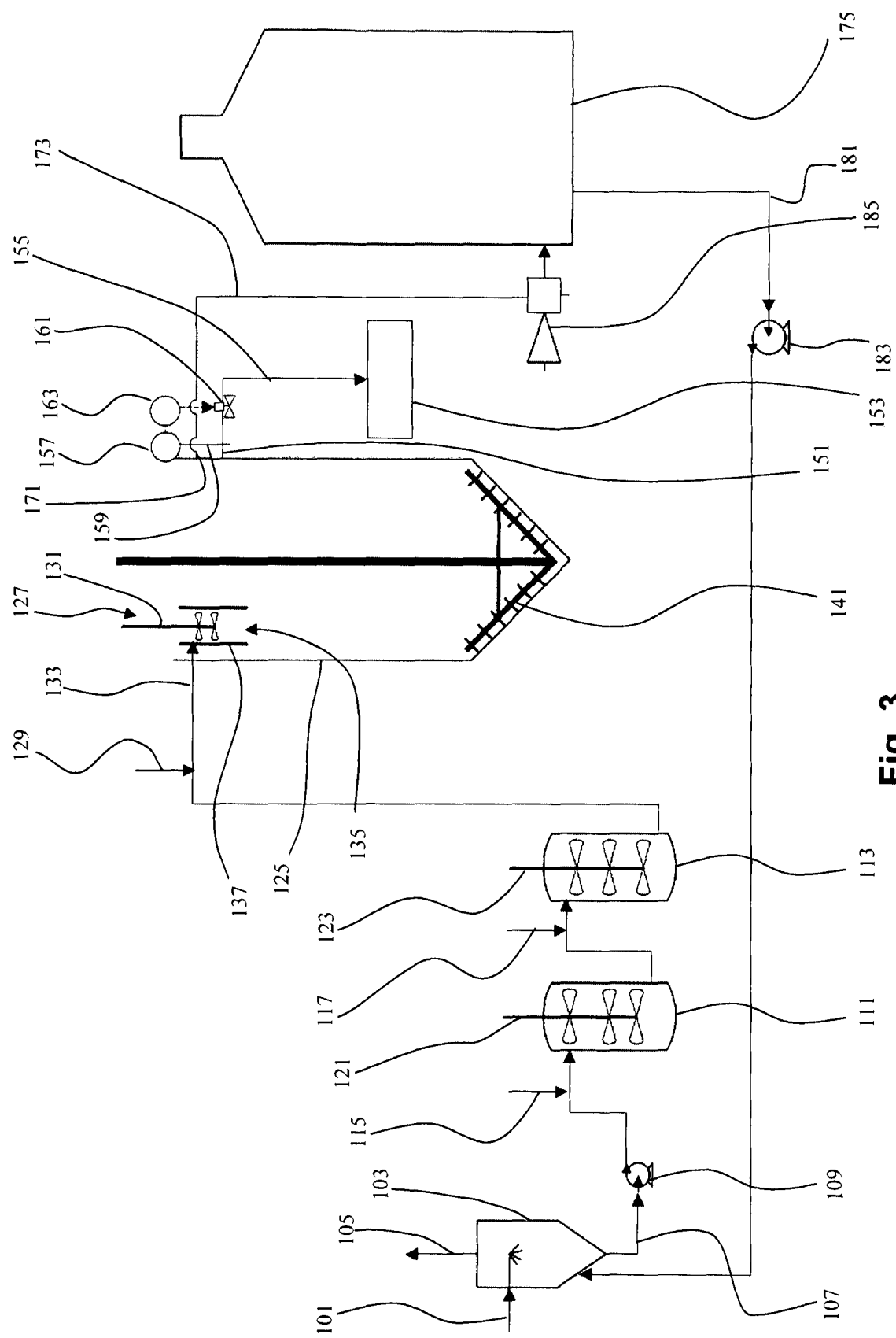
FIG. 3 represents a separation installation including a settler according to the present invention in the context of a Bayer process using one type of control scheme.
Figure 4:
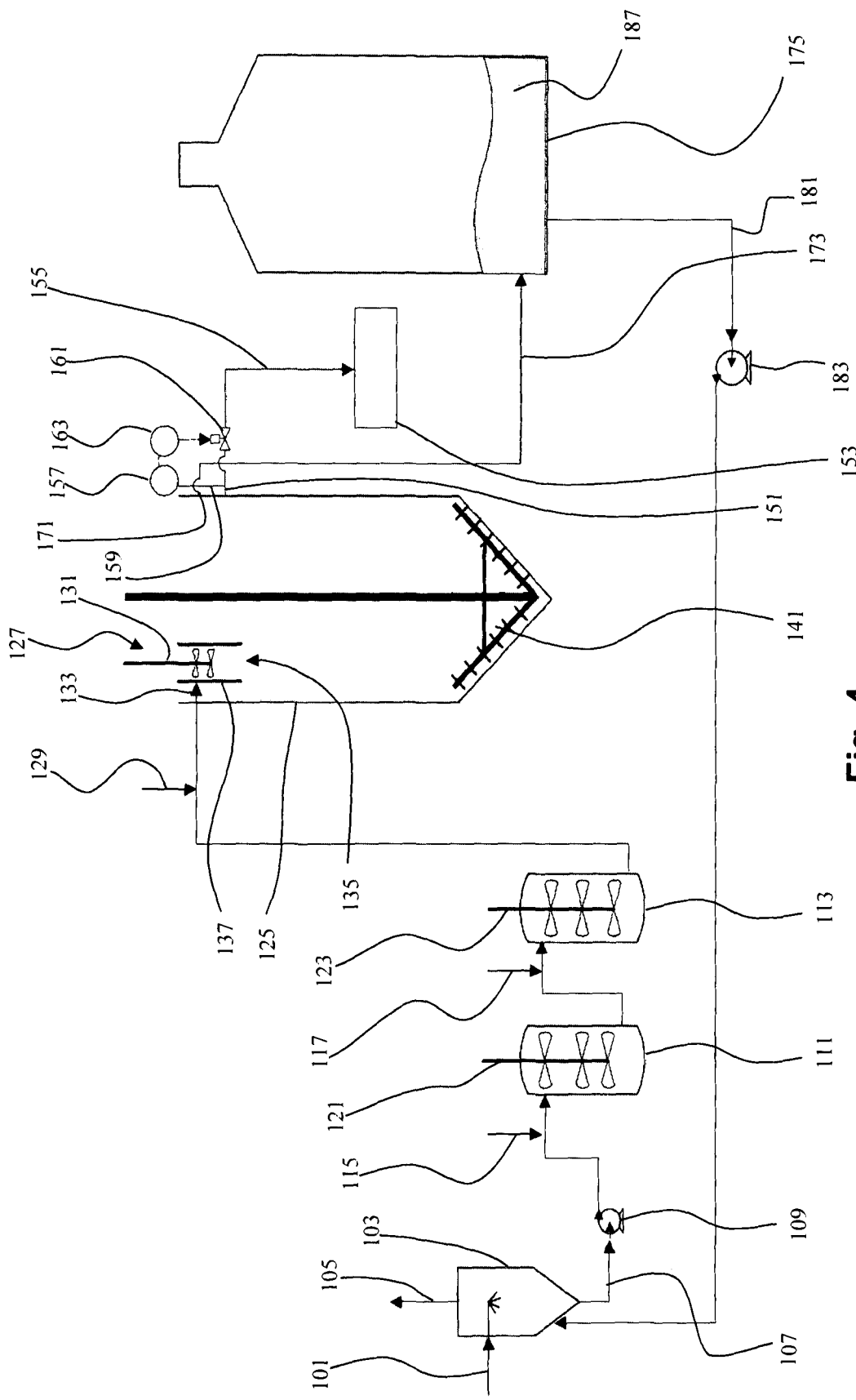
FIG. 4 represents a separation installation including a settler according to the present invention in the context of the Bayer process using another type of control scheme.

FIG. 3 and FIG. 4 illustrate a separation installation including a settler according to the present invention in the context of a Bayer process using two different types of control scheme. The process illustrated focuses on the separation step of the Bayer process, more precisely from the depressurization step to the precipitation step of the Bayer process.

Referring to FIG. 3 and FIG. 4, a stream of a slurry 101 coming from the digestion step is flash-cooled to ambient temperature and pressure in a series of flash tanks. For simplifying the diagram, only the last flash tank 103 of the depressurization step has been represented with its steam outlet 105. The depressurized slurry 107, which comprises an enriched sodium aluminate liquor of dissolved alumina and insoluble residues formed of particles of undissolved bauxite ore, is pumped, using a pump 109, to a pre-treatment step, where it is treated by adding a flocculants and by mixing the flocculants and said slurry.

The pre-treatment step comprises an initial mixing step with a first part of the flocculants that comprises passing the slurry through a first mixing tank 111 and a second mixing tank 113. The first part of the flocculants is added via a first flocculants feeding line 115 to the line between the pump 109 and the first mixing tank 111, and via a second flocculants feeding line 117 to the line between said first mixing tank 111 and the second mixing tank 113. The flocculants may be any suitable flocculant, such as a polyacrylate or a hydroxamate. The arrangement is such that it is possible to vary the dosage rate of the flocculant, depending on the process requirements. The first and the second mixing tank 111, 113 are both equipped with a rotating stirrer, respectively 121, 123. The rotating stirrers 121, 123 may have variable drives that make it possible to rotate the stirrers at different rates in each tank depending on the process requirements. The first and second mixing tanks 111, 113 of the pre-treatment step are arranged in series, with process slurry inlets in upper sections of said tanks and process liquor outlets in lower sections of said tanks. The slurry flows serially through the mixing tanks 111, 113 so that 100% of the slurry flows through each of the tanks.

The pre-treatment step is carried out in order to obtain a flocculated slurry that is then introduced into a gravity settler vessel 125, the flocculation of the slurry allowing a better settling performance in the gravity settler vessel.

The pre-treatment step further comprises an additional mixing step, hereafter referred to as a final mixing step, for mixing the slurry with the flocculants, said final mixing step taking place in a slurry inlet means of the gravity settler vessel 125, conventionally referred to as a feed well 127. A second part of the flocculants is added via another flocculants feeding line 129 to a line between the second mixing tank 113 and the feed well 127. Again, it is possible to vary the dosage rate of the flocculant added via line 129 according to the process requirements.

A feed well is normally used for introducing the resulting flocculated slurry into said the gravity settler vessel. According to an aspect of the invention, the feed well 127 is used to further mix the flocculants with the slurry and therefore comprises mixing means, such as a rotating stirrer. More precisely, the mixing means of the feed well 127 comprises two rotating stirrers 131 mounted on the same axis, to make sure that most of the internal volume of said feed well is agitated. The rotating stirrers 131 may have variable drives. The two rotating stirrers 131 are respectively arranged lower and higher in relation to a slurry feeding pipe 133, to make sure that the flocculated slurry is fed in an agitated region of the feed well.

It was found that mixing the flocculants with the slurry just before the settling step in the settler vessel 125 significantly improves the performance of the separation step. The performance of the separation step is even more improved, when the rate of mixing in the first and the second mixing tank 111, 113 is higher than the rate of mixing in the feed well 127. In other words, reducing the rate of mixing in the final mixing step, and having this final mixing step just before the settling step of the resulting flocculated slurry allows to obtain a clarified liquor that have a reduced amount of solid particles in slurry, for example less than 10 mg/L.

The speed at the tip of the rotating stirrers 131 are adjusted to between 0.3 to 0.7 m/s. The feed well 127 have a slurry opening 135 through which the flocculated slurry is introduced into the gravity settler vessel. The slurry opening 135 is arranged in the bottom of the feed well 127, to prevent accumulation at the bottom of said feed well. The speed of the flocculated slurry introduced into the gravity settler vessel is maintained from 100 to 150 m/h to distribute the solid materials in most of the internal volume of the gravity settler vessel 125 and to prevent attrition of the aggregated solid materials.

The feed well comprises an upright cylindrical wall 137, the rotating stirrer being operated in a circular area having a diameter that is approximately 0.6 time the diameter of said upright cylindrical wall. The slurry feeding pipe 133 is arranged in such a way that the slurry is fed tangentially into the slurry inlet means. The gravity settler vessel 125 has a rake 141, the slurry opening 135 being displaced laterally relative to a main axis of the rake. Such configuration implies that the axis of the stirrers 131 of the feed well 127 is different from the axis of the rake 141, allowing the rotating speed of the feed well stirrers 131 to be different than the one of the rake 141.

The solid and liquor components of the flocculated slurry separates in the gravity settler vessel 125 to produce a clarified liquor at the top of said vessel and a thickened slurry at the bottom of said vessel.

The gravity settler vessel is provided with a first overflow outlet 151 that is connected to the precipitation means 153 via a line 155. A turbidity probe 157 is arranged on the line 155 for determining a measured value of the turbidity of a secondary stream 159 of the clarified liquor. The line 155 is also equipped with an isolation valve 161. The isolation valve 161 is functionally connected to the turbidity probe via process control means 163 that includes means for comparing the measured value with a predetermined threshold that preferably corresponds to a solid material content in the clarified liquor of 10 mg/L.

As far as the turbidity measurement is concerned, it can be carried out by withdrawing a secondary stream of clarified liquor and by measuring continuously the turbidity of said secondary stream of clarified liquor. The measurement of the turbidity is usually done by measuring the attenuation of light as it passes through a sample column of the clarified liquor. The unit used to quantify turbidity is usually Nephelometric Turbidity Units, or the corresponding acronym NTU. A pre-calibration is often necessary to determine the concentration of solid particle in the clarified liquor from the measured value of turbidity. The secondary stream of clarified liquor can be treated for preventing scaling in the line, for instance by adding caustic or any other type of additives that can reduce scaling. The temperature of the line can also be increased in order to prevent precipitation of alumina in the line. The secondary stream of clarified liquor or any line on which the turbidity probe is mounted can be traced to increase the temperature of the clarified liquor in order to prevent precipitation of alumina in the line.

The gravity settler vessel is also provided with a second overflow outlet 171 that is connected to the pretreatment step. The second overflow outlet 171 is in direct communication with a buffer tank 175, via a redirecting line 173. By direct communication, it is meant that there is no means that could stop the flow in said line. The second overflow outlet 171 is positioned at a higher level than the first overflow outlet 151.

In normal operation, that is to say while the measured value of turbidity is less than the predetermined threshold, an overflow stream of the clarified liquor is withdrawn from a first overflow outlet 151 and fed directly to the precipitation means 153 via the line 155. The process control means 163 maintains the isolation valve 163 open, while the measured value is less than the predetermined threshold.

In abnormal operation, that is to say when the measured value is more than the predetermined threshold, the isolation valve 163 is actuated in a close position by the process control means 163, thereby stopping withdrawing the overflow stream from the first overflow outlet 153. The clarified liquor is then naturally redirected to the pre-treatment step via the second overflow outlet 171 and the redirecting line 173 between said second overflow outlet 171 and the buffer tank 175.

Since the second overflow outlet 171 is positioned higher than the first overflow outlet 151, there is no need to have a valve on the redirecting line 173. This prevents any scaling that could be formed on a valve which would be particularly detrimental to valve opening operation. As far as the isolation valve 161 is concerned, it will be maintained closed only in abnormal operation. Since the duration while the isolation valve 161 is maintained closed is usually limited, scale should not have time to build up and the opening of the isolation valve 161 should not be prevented by the presence of scale.

In both embodiments represented respectively in FIG. 3 and FIG. 4, the redirecting of the clarified liquor to the pre-treatment step, when the measured value is more than the predetermined threshold, is carried out via a buffer tank 175. The redirected clarified liquor can be referred to as off spec clarified liquor. The residence time in the buffer tank provides more time for acting on the operation of the separation step, and more particularly on the pre-treatment step of said separation step. In both cases, the clarified liquor is introduced in a lower part of the buffer tank 175, in order to prevent the cooling of the off spec clarified liquor that would lead to a detrimental precipitation of alumina in said buffer tank. In both cases, the off spec clarified liquor can be redirected from the bottom of the buffer tank 175 to the pre-treatment step, via a line 181 equipped with a pump 183 and via the bottom of the flash tank 103 of the depressurization step.

In the separation installation of FIG. 3, steam is injected in the buffer tank via steam injector 185, in order to stabilize the liquor and prevent the precipitation of alumina in said buffer tank.

In the separation installation of FIG. 4, a minimal quantity of caustic soda 187 is maintained in the buffer tank, for stabilizing the liquor and prevents precipitation of alumina in said buffer tank. The minimal quantity of caustic soda is determined so that the weight ratio of alumina over the caustic soda is reduced by predetermined value, for instance 0.60.

Figure 5:
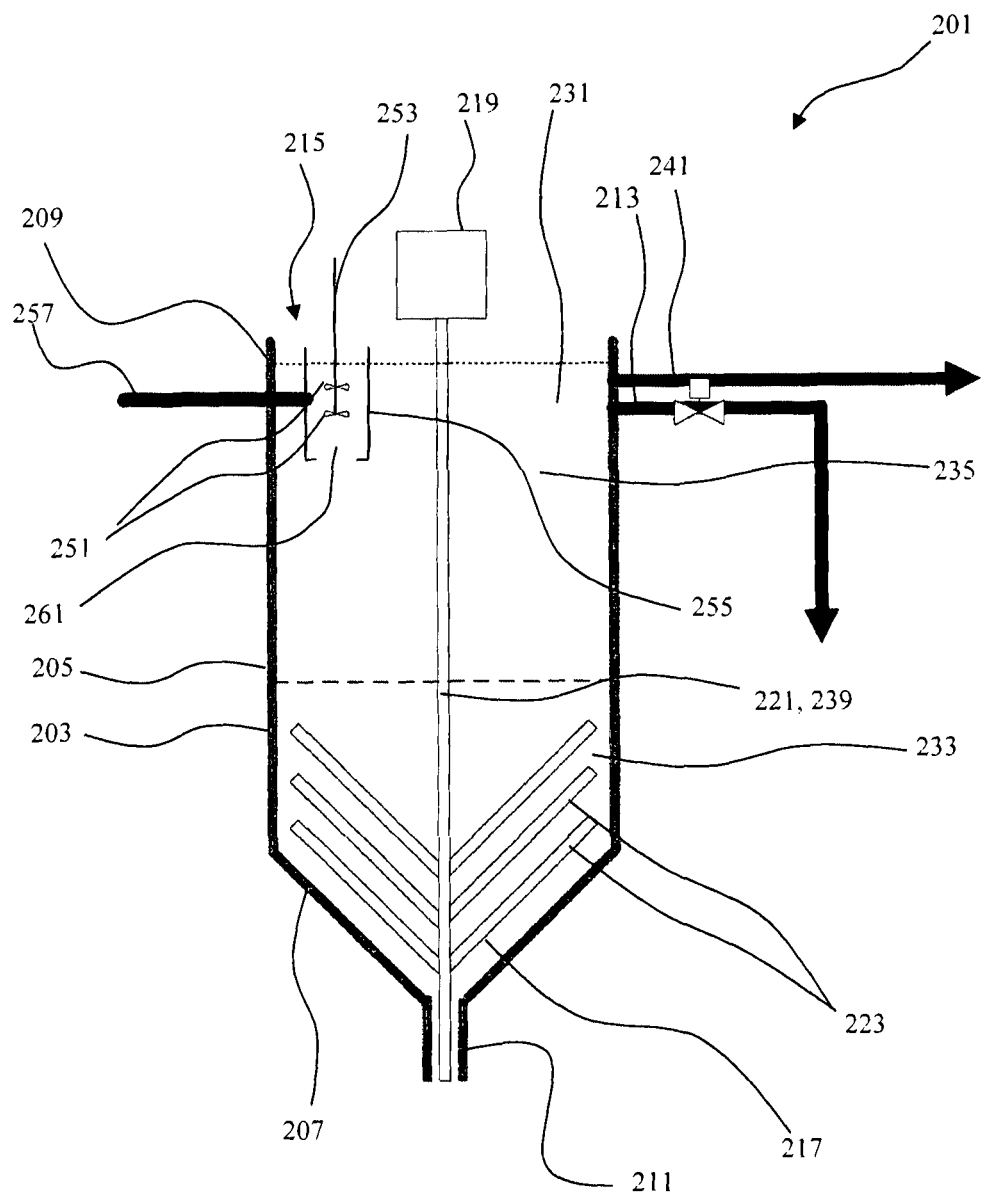
FIG. 5 represents a vertical cross section showing an example of settler according to the present invention.

Referring now to FIG. 5, the above described features of the gravity settler that can be used in the separation installation are now described in more details, outside the context of the Bayer process. In effect, the represented gravity settler could be used for decanting or thickening any type of mineral slurries.

The gravity settler 201 comprises a vessel or a tank 203 for holding and decanting a body of slurry to form a thickened slurry as a lower layer and a clarified liquid as an upper layer, the tank having a side wall 205, a bottom 207 and a top 209, an outlet 211 for the thickened slurry at the bottom of the tank, a first overflow outlet 213 for the clarified liquid layer near the top of the tank, and a slurry inlet means also referred to as feed well 215 near the top of the tank for introducing fresh slurry into the tank. The gravity settler includes a central stirrer in the form of a rotating rake 217 operated by a motor 219 having a generally vertical axis around which the stirrer rotates or reciprocates. The rake consists of an upright central vertical shaft 221 having a number of upwardly-angled, radially-extending arms 223 forming tines rigidly attached to the central shaft.

The slurry is usually pre-treated by adding flocculants and the resulting flocculated slurry collects within the tank to an upper surface 231 near the top 209 of the tank. The mud flocs settle to form a lower layer of thickened mud 233 and an upper layer of clarified liquor 235. As it rotates around its central vertical axis 239, the rake 217 forms channels in the flocculated solids (active mud) which allow egress of water to the surface and thus facilitate densification of the mud. The thickened mud is withdrawn from the underflow outlet 211. The first overflow outlet 213 is designed to be operational in normal operation that is to say while the clarity of the clarified liquid is within a target specification. An isolation valve is usually provided on the line connected to the first overflow outlet 213. In abnormal operation, that is to say when the clarity of the clarified liquid is outside the target specification, the isolation valve is actuated in a close position.

The gravity settler 201 comprises a second overflow outlet 241 that is positioned at a higher level than the first overflow outlet 213. The second overflow outlet 241 is designed for withdrawing an off spec overflow stream of the clarified liquor, when the clarity of the clarified liquid is outside the target specification. The second overflow outlet 241 is usually connected to an upstream part of the process where the gravity settler is used, such as a pre-treatment step for adding a flocculant to the fresh slurry to be treated and for mixing said flocculant and said fresh slurry. Since the second overflow outlet 241 is positioned at a higher level than the first overflow outlet 213, there is no need to have a valve in the line connected to the second overflow outlet and the second overflow outlet can be in direct communication to the upstream part of the process where the off spec clarified liquid is recycled. Consequently, there is no prejudicial effect of the scale on valve operation, more particularly on valve opening, since there is no valve.

The feed well 215 is provided with mixing means, two rotating blade type stirrers 251 that are mounted on the same axis 253. The use of two or more rotating stirrers is to make sure that most of the internal volume of the slurry inlet means is agitated. The feed well 215 have an upright cylindrical wall 255. The rotating stirrers 251 are operated in a circular area having a diameter that is from 0.4 to 0.8, for example 0.6, time the diameter of the upright cylindrical wall 255. Such configuration allows optimizing the contact between flocculants and solid materials within the slurry inlet means.

The feed well 215 has a slurry feeding pipe 257 arranged in such a way that the slurry is fed tangentially into the slurry inlet means. This causes the slurry to swirl around the inside of the feed well and allows decelerating the speed of the flocculated slurry more gradually along the side wall of the slurry inlet means, thereby limiting the attrition of the aggregates of solid material. It also minimizes currents in the tank 205 and helps mixing of slurry and flocculant in the feed well before the slurry enters the tank. The two rotating stirrers 251 are respectively arranged lower and higher in relation to the slurry feeding pipe, to make sure that the flocculated slurry is fed in an agitated region of the feed well 215.

The feed well 215 has a slurry opening 261 through which the flocculated slurry is introduced into the gravity settler tank, said slurry opening being arranged in the bottom of said feed well. This is to make sure that the solid particles of the flocculated slurry do not accumulate at the bottom of the feed well.

The feed well 215 defines a through flow area where the mixing means 251 are arranged. The mixing means 251 are bottomless, or more precisely do not contain any mechanical part on which solids could accumulate.

The slurry opening 261 of the feed well 215, through which the flocculated slurry is introduced into the gravity settler tank 205, allows some introduction of slurry from the body of slurry hold by the tank into the feed well. This is usually caused by convection currents within the body of slurry hold by the tank. The feed well 215 being located in the top part of the settler tank, the slurry from the body of slurry that is introduced into the feed well contains very little solids and is essentially made of liquor or supernatant liquor. Consequently, the flocculant that is mixed with fresh slurry, within the feed well 215, is at the same time diluted with supernatant liquor from the settler tank, thereby promoting the dilution effect as well as optimizing the flocculation process.

In addition, since the mixing by the mixing means 251 is not confined, but applied to most of the internal volume of the feed well 215 or to the whole internal volume of the feed well 215, the above-mentioned dilution effect is thoroughly applied to the mixture of fresh slurry and flocculants in a very controlled manner. Consequently, the dilution is homogeneous, which leads to an even more efficient flocculation process.

The slurry opening 261 is displaced laterally relative to the main axis 221 of the rake 217. The feed well is thus laterally displaced relative to the central vertical axis and the rake shaft 221. In other words, the feed well is not positioned in the immediate vicinity of the central rake shaft 221. The advantage thereby obtained is that it reduces the tendency of the coarse particles to accumulate around the bottom of the rake 217 in the region of the underflow outlet 211. Such a configuration of the feed well in relation to the gravity settler also prevents the accumulation of solid particles and the blocking of the underflow of thickened material. In addition, such an off-centre feed well combined with the use of mixing means in said off-centre feed well allows operation of distinctive mixing conditions respectively in the feed well and in the gravity settler vessel. For instance, when the mixing means of the feed well comprise one or more rotating stirrers mounted on the same rotating axis, the off-centre configuration of the feed well allows setting the rotating speed of the stirrers(s) that is different to the speed of the rake in the gravity settler vessel. In general, the rotating speed of the feed well stirrer is greater than the one of the rake inside the gravity settler vessel.

In the context of the Bayer process, the settler and the separation installation of the present invention allow a simplification of the separation step due to the suppression of the filtration step. The concentration of solid particles of insoluble residues in the clarified liquor that is, in normal operation, directly fed to the precipitation step has a high level of purity that can be reliably maintained over time, so that the alumina recovery step that follows the separation step can be run with very limited disturbances.

Example 1

Two series of trials were conducted, in order to measure and compare the impact on alumina quality, when replacing the separation step of the prior art, which includes a settling step followed by a filtration step, by a new separation step 70 including a settling (83) and a pre-treatment step (81) according to a preferred embodiment of the invention.

A first series of trials was conducted in order for reproducing the operating conditions of the Bayer process according to the prior art. Grinded bauxite and depleted sodium aluminate solution were both sampled from a commercial alumina refinery.

In a first cycle of the first series of trials, the sampled bauxite and solution were both mixed together with lime, the weight of added lime being equal to 0.1% of the weight of bauxite. The resulting slurry was then transferred to an agitated pressurized vessel at 80° C. for 6 hours, for reproducing predesilication step conditions. The resulting predesilicated slurry was then transferred into another pressurized vessel and kept at 145° C. for 45 minutes. The resulting digested slurry was then cooled down before being placed into a cylinder with flocculant in a thermostatic bath, thereby reproducing the clarification step. The clarified liquor recovered from said slurry was then mixed with tricalcium aluminate, before being filtered in a vacuum filter for obtaining a filtrate. Alumina trihydrate seeds were added to the filtrate, and the resulting mixture was introduced in a rotary bath for 20 hours, where the temperature was controlled at 60° C. for reproducing a precipitation step. The aluminum trihydrate was then recovered by filtration and the resulting depleted sodium aluminate liquor was then used for a second cycle.

In three following cycles of the first series of trials, the same experimental operations as for the first cycle were performed, with an initial step of mixing the depleted sodium aluminate solution recovered in the preceding cycle with another sample of grinded bauxite with the same amount of lime.

For the second series of trials, the above operations were reproduced, except that the digested slurry was pretreated and that filtration was suppressed. The pretreatment of the digested slurry was carried out by transferring said digested slurry into an agitated vessel with a flocculant, and by mixing the flocculant and the digested slurry for obtaining a flocculated slurry. This pretreatment of the digested slurry was done after cooling down said digested slurry and before being placing the slurry into a cylinder in a thermostatic bath.

A sample of aluminum trihydrate recovered at the end of each cycle was analyzed for impurities and the results are shown in table 1. Furthermore, a sample of the depleted sodium aluminate liquor was taken at the end of each cycle before the precipitation step, that is to say the filtrate, and after the precipitation step, for the analysis of total organics content. These results are shown in table 2.

TABLE 1

| | Impurities in aluminium trihydrate produced during the trials | | | | | | | |
|---|---|---|---|---|---|---|---|---|
| | Calcium % p/p CaO | | Iron % p/p Fe2O3 | | Sodium % p/p Na2O | | Silicon % p/p SiO2 | |
| | Without filtration | With filtration | Without filtration | With filtration | Without filtration | With filtration | Without filtration | With filtration |
| Cycle no 1 | 0.007 | 0.013 | 0.009 | 0.016 | 0.370 | 0.370 | 0.012 | 0.012 |
| Cycle no 2 | 0.009 | 0.009 | 0.008 | 0.008 | 0.350 | 0.350 | 0.009 | 0.012 |
| Cycle no 3 | 0.007 | 0.009 | 0.008 | 0.011 | 0.360 | 0.350 | 0.011 | 0.010 |
| Cycle no 4 | 0.008 | 0.009 | 0.011 | 0.008 | 0.330 | 0.360 | 0.013 | 0.008 |
| Average | 0.008 | 0.010 | 0.009 | 0.011 | 0.353 | 0.358 | 0.011 | 0.011 |
| Standard-deviation | 0.001 | 0.002 | 0.001 | 0.004 | 0.017 | 0.010 | 0.002 | 0.002 |

TABLE 2

| | Total organics content (g/l) in the liquor | | | |
|---|---|---|---|---|
| | Before precipitation | | After precipitation | |
| | Without filtration | With filtration | Without filtration | With filtration |
| Cycle no 1 | 0.92 | 0.92 | 0.96 | 0.91 |
| Cycle no 2 | 0.94 | 0.90 | 0.95 | 0.97 |
| Cycle no 3 | 0.93 | 0.92 | 0.96 | 0.96 |
| Cycle no 4 | 0.91 | 0.95 | 0.98 | 0.98 |
| Average | 0.93 | 0.92 | 0.96 | 0.96 |
| Standard-deviation | 0.01 | 0.02 | 0.01 | 0.03 |

The results show that there is no statistically significant impact on alumina quality and organics content when replacing the separation step of the prior art, which includes a settling step followed by a filtration step, by a new separation step including a settling and a pre-treatment step according to a preferred embodiment of the invention. However, there are significant costs savings in lime and other raw materials, equipment and manpower.

Example 2

In order to test the pretreatment means and the gravity settler vessel of the separation step 70, a separation pilot unit was constructed next to a commercial refinery. The separation pilot unit includes a first mixing tank and a second mixing tank connected in series, each mixing tank having a flocculant introduction line. The outlet of the second mixing tank is connected to an agitated off-centered feed well of a gravity settler vessel. A stream of slurry was withdrawn from the depressurization step 30 of the refinery and fed to separation pilot unit.

In a first trial, a hydroxamate based flocculant was only added in the feed well of the gravity settler vessel, without any agitation in the feed well. The quantity of flocculant added to the slurry fed to the separation pilot unit was 100 g/t of solid material. An overflow stream was withdrawn out of the gravity settler vessel and the measured clarity of said overflow was, in average, 43 mg/l.

In a second trial, the same flocculant was added in the first mixing tank with a dosage of 70 g/t of solid material, in the second mixing tank with a dosage of 42 g/t of solid material, and in the feed well of the gravity settler vessel with a dosage of 28 g/t of solid material. The agitator in the first mixing tank was rotated so that the speed at the tip of said agitator was maintained at 1.9 m/h. The agitator in the second mixing tank was rotated so that the speed at the tip of said agitator was maintained at 0.9 m/h. The agitator in the feed well was rotated so that the speed at the tip of said agitator was maintained at 0.3 m/h. The measured clarity of the overflow stream withdrawn out of the gravity settler vessel was 0.8 mg/l. Such a low value of the clarity would allow feeding the overflow stream withdrawn from the gravity settler vessel directly to the precipitation step, without the need of any further filtration.

The invention claimed is:

1. A settler for decanting mineral slurries, comprising:
a tank for holding and decanting a body of slurry to form a thickened slurry as a lower layer and a clarified liquid as an upper layer, the tank having a side wall a bottom and a top,
an outlet for the thickened slurry at the bottom of the tank,
a first overflow outlet for withdrawing an overflow stream of the clarified liquid,
a slurry inlet means near the top of the tank for directly introducing fresh slurry into the tank, the slurry inlet means having a slurry opening about a bottom of the slurry inlet means that opens directly into the tank, through which the fresh slurry joins the body of slurry in the tank,
a stirrer having a generally vertical axis around which the stirrer rotates or reciprocates, wherein said slurry opening is displaced laterally relative to said generally vertical axis of the stirrer and said slurry inlet means comprises mixing means,
a second overflow outlet configured to withdraw an off spec overflow stream of the clarified liquid when a measured value representative of a concentration of solid particles in the clarified liquid exceeds a predetermined threshold, the overflow stream of the clarified liquid being withdrawn from the first overflow outlet while said measured value is less than the predetermined threshold,
an isolation valve in fluid communication with the first overflow outlet and is actuatable when the measured value representative of the concentration of solid particles in the clarified liquid exceeds the predetermined threshold to direct the off spec overflow stream to the second overflow outlet, and
a buffer tank in fluid communication with the second overflow outlet to receive the off spec overflow stream, wherein the buffer tank is part of a recycle loop to treat and return the off spec overflow stream to the tank,
wherein the slurry inlet means comprise an upright cylindrical wall, the mixing means of said slurry inlet means being operated in a circular area having a diameter that is from 0.4 to 0.8 times the diameter of said upright cylindrical wall.

2. The settler according to claim 1, wherein the slurry inlet means defines a through flow area comprising the mixing means.

3. The settler according to claim 1, wherein the mixing means operates independently from the stirrer.

4. The settler according to claim 1, wherein the slurry inlet means is configured to avoid accumulation of solids from the fresh slurry immediately upstream of the slurry opening.

5. The settler according to claim 1, wherein the mixing means of the slurry inlet means comprises at least one rotating stirrer.

6. The settler according to claim 1, wherein the slurry inlet means comprise a slurry feeding pipe arranged in such a way that the slurry is fed tangentially into the slurry inlet means.

7. The settler according to claim 6, wherein the mixing means of the slurry inlet means comprise two rotating stirrers, arranged lower and higher in relation to the slurry feeding pipe.

8. The settler according to claim 1, wherein the bottom of the slurry inlet means includes a bottom surface, and the slurry opening is located in the bottom surface of the slurry inlet means.

9. The settler according to claim 1, wherein the second overflow outlet is positioned at a higher level than the first overflow outlet.

10. A separation installation for separating a clarified liquid from a thickened slurry of a mineral slurry comprising pre-treatment means for adding flocculants to a fresh slurry and for mixing said fresh slurry with said flocculants and obtain a flocculated slurry, wherein the separation installation further comprises a settler according to claim 1, said settler being connected to said pre-treatment means for decanting said flocculated slurry and for producing the clarified liquid.

11. The settler according to claim 1, wherein said slurry inlet means is configured such that the slurry introduced into the tank reaches the mixing means prior to passing through said slurry opening.

12. The settler according to claim 1, wherein said slurry inlet means is spaced laterally a distance away from said stirrer.

13. A settler for decanting mineral slurries, comprising:
a tank for holding and decanting a body of slurry to form a thickened slurry as a lower layer and a clarified liquid as an upper layer, the tank having a side wall a bottom and a top,
an outlet for the thickened slurry at the bottom of the tank,
a first overflow outlet for withdrawing an overflow stream of the clarified liquid,
a slurry inlet near the top of the tank for directly introducing fresh slurry into the tank, the slurry inlet having a slurry opening about a bottom of the slurry inlet means that opens directly into the tank, through which the fresh slurry joins the body of slurry in the tank,
a stirrer having a generally vertical axis around which the stirrer rotates or reciprocates, wherein said slurry opening is displaced laterally relative to said generally vertical axis of the stirrer and said slurry inlet comprises a mixer, and
a second overflow outlet configured to withdraw an off spec overflow stream of the clarified liquid when a measured value representative of a concentration of solid particles in the clarified liquid exceeds a predetermined threshold, the overflow stream of the clarified liquid being withdrawn from the first overflow outlet while said measured value is less than the predetermined threshold,
an isolation valve in fluid communication with the first overflow outlet and is actuatable when the measured value representative of the concentration of solid particles in the clarified liquid exceeds the predetermined threshold to direct the off spec overflow stream to the second overflow outlet, and a buffer tank in fluid communication with the second overflow outlet to receive the off spec overflow stream, wherein the buffer tank is part of a recycle loop to treat and return the off spec overflow stream to the tank, wherein the slurry inlet means comprise an upright cylindrical wall, the mixer of said slurry inlet means being operated in a circular area having a diameter that is from 0.4 to 0.8 times the diameter of said upright cylindrical wall.

14. The settler according to claim 13, wherein said slurry inlet is configured such that the slurry introduced into the tank reaches the mixer prior to passing through said slurry opening.

15. The settler according to claim 13, wherein said slurry inlet is spaced laterally a distance away from said stirrer.

16. A method for separating a clarified liquid from a thickened slurry of a mineral slurry, that includes settling a fresh slurry in a settler which comprises:

introducing said fresh slurry into a body of slurry in a tank provided with a stirrer rotating or reciprocating about a generally vertical axis to form the thickened slurry as a lower layer and the clarified liquid as an upper layer, said fresh slurry being directly introduced into said body of slurry through a slurry opening of a slurry inlet means, wherein the opening is positioned about a bottom of the slurry inlet means and opens directly into the tank, removing thickened slurry from an outlet at a bottom of the tank, removing an overflow stream of the clarified liquid adjacent to a top of the tank from a first overflow outlet while a measured value representative of a concentration of solid particles in the clarified liquid is less than a predetermined threshold, and removing an off spec overflow stream of the clarified liquid from a second overflow outlet when the measured value exceeds the predetermined threshold, including actuating an isolation valve in fluid communication with the first overflow outlet when the measured value representative of the concentration of solid particles in the clarified liquid exceeds the predetermined threshold to direct the off spec overflow stream to the second overflow outlet, wherein the off spec overflow stream is received in a buffer tank in fluid communication with the second overflow outlet, wherein the buffer tank is part of a recycle loop to treat and return the off spec overflow stream to the tank, characterized in that said fresh slurry is mixed using mixing means in said slurry inlet means, and is introduced into the tank through said opening at a position spaced laterally from said generally vertical axis of the stirrer, and further characterized in that the slurry inlet means comprise an upright cylindrical wall, and the mixing means of said slurry inlet means is operated in a circular area having a diameter that is from 0.4 to 0.8 times the diameter of said upright cylindrical wall.

17. The method according to claim 16, characterized in that the slurry inlet means defines a through flow area comprising the mixing means.

18. The method according to claim 16, characterized in that the method further comprises pretreating the fresh slurry in a pre-treatment step by adding a flocculant to said fresh slurry and mixing the flocculant and the slurry to obtain a flocculated slurry.

19. The method according to claim 18, characterized in that the pre-treatment step comprises:

an initial mixing step of the slurry with at least part of the flocculants, a final mixing step of the slurry with the flocculants in the slurry inlet means, and selecting a rate of mixing in the initial mixing step that is higher than the rate of mixing in the final mixing step.

\* \* \* \* \*